United States Patent [19]

Kaido et al.

[11] Patent Number: 5,252,405
[45] Date of Patent: Oct. 12, 1993

[54] RUBBER COMPOSITION FOR COATING STEEL CORDS AND RUBBER PRODUCT USING THE SAME

[75] Inventors: Hiroyuki Kaido; Kazuyoshi Kayama, both of Yokohama; Tetsuji Kawazura, Ninomiyamachi; Hideyuki Oishi, Hiratsuka; Yoshihisa Ogihara, Sawara; Humiaki Yoneyama, Kamisumachi, all of Japan

[73] Assignees: The Yokohama Rubber Co., Ltd.; Dainippon Ink and Chemicals, Inc., Tokyo, Japan

[21] Appl. No.: 854,936

[22] Filed: Mar. 20, 1992

[30] Foreign Application Priority Data

Mar. 25, 1991 [JP] Japan .................................. 3-60303

[51] Int. Cl.$^5$ .......................... B32B 15/08; C08C 19/00
[52] U.S. Cl. ..................................... 428/462; 428/465; 428/492; 525/332.6
[58] Field of Search ............... 428/465, 462, 492; 525/332.6; 524/526; 530/233

[56] References Cited

U.S. PATENT DOCUMENTS

| | | | |
|---|---|---|---|
| 4,391,318 | 7/1983 | Maxey et al. | 428/465 X |
| 4,513,123 | 4/1985 | Day et al. | 525/332.6 |
| 4,569,382 | 2/1986 | Maxey et al. | 428/462 X |
| 4,588,766 | 5/1986 | Tate | 524/526 X |
| 4,609,499 | 9/1986 | Esashi et al. | 530/233 X |

*Primary Examiner*—Thomas J. Herbert, Jr.
*Attorney, Agent, or Firm*—Nikaido, Marmelstein, Murray & Oram

[57] ABSTRACT

A rubber composition for coating steel cords, comprising a raw material rubber and, compounded therein, a methylolmelamine derivative and a product of a reaction of a cobalt salt of an organic acid with a metaboric acid ester, and a rubber product reinforced with rubber-coated steel cords comprising steel cords coated with the rubber composition.

11 Claims, No Drawings

RUBBER COMPOSITION FOR COATING STEEL CORDS AND RUBBER PRODUCT USING THE SAME

BACKGROUND OF THE INVENTION

The present invention relates to a rubber composition for coating steel cords improved in the adhesion to steel cords, and a rubber product reinforced with steel cords coated with the rubber composition.

Steel cords are widely used as the reinforcement for rubber products, such as pneumatic tires and conveyor belts, by virtue of their far superiority in overall performance as the reinforcement as composed to reinforcing cords made of other fiber materials.

In the conventional steel cords used for these pneumatic tires and conveyor belts, the steel cords side was subjected to brass plating, galvanizing, etc., for the purpose of enhancing its adhesion to the rubber, and various proposals have been made on the composition and thickness of the plating. On the other hand, an adhesion accelerator, for enhancing the adhesion of the steel cords to the coating rubber is used on the side of the rubber composition for coating the steel cords. Typical examples of the adhesion accelerator include cobalt salts of natural acids, such as cobalt naphthenate, cobalt rosinate and cobalt stearate, and cobalt salts of synthetic acids, such as cobalt neodecanoate, cobalt octylate and cobalt propionate.

Although the rubber compositions containing these cobalt salts of organic acids exhibit a good initial adhesion to steel cords, they are disadvantageous in that the adhesion becomes remarkably lower during use or storage under high-temperature and high-humidity conditions.

In order to solve this drawback, for example, (U.S. Pat. No. 4,234,496) proposes an adhesion accelerator comprising a complex of a carboxylic acid having 7 to 11 carbon atoms with boron, and U.S. Pat. No. 4,588,766 proposes an adhesion accelerator comprising a product of a reaction of a carboxylic acid salt of cobalt or nickel with a boric acid salt of an alkaline earth metal. These adhesion accelerators, however, have drawbacks that they lower the initial adhesion to the steel cords and further deteriorate rubber properties.

Further, U.S. Pat. No. 4,609,499 proposes a rubber composition containing a reaction product comprising a monocarboxylic acid, cobalt and boron, and U.S. Pat. No. 4,513,123 proposes a rubber composition containing an organic cobalt compound, sulfur and dithiodipropionic acid. However, the former is unsatisfactory in its waterproof adhesion when it is wet, while in the latter, the adhesion, which is very important for the production of reinforced rubber products, greatly depends upon vulcanization conditions, such as vulcanization temperature and time.

Further, Japanese patent application Kokai publication No. 1-153783 discloses a metallic soap comprising a cobalt salt of an organic carboxylic acid and boron, which has a low content of water-extractable boron. Although this soap has an improved wet heat resistance, it does not satisfy the practical performance requirement due to the great dependency of the adhesion upon the vulcanization conditions.

SUMMARY OF INVENTION

An object of the present invention is to provide a rubber composition which exhibits a good initial adhesion to steel cords, is less liable to having this adhesion reduced during use or storage under high-temperature and high humidity conditions, and has excellent rubber properties; and a rubber product comprising reinforcing steel cords coated with this rubber composition.

The above-described object of the present invention can be attained by a rubber composition comprising a rubber as a raw material and, compounded therein, a particular methylolmelamine derivative and a product of a reaction of a cobalt salt of an organic acid with a metaboric acid ester. This invention also comprises and a steel cord coated with this rubber composition.

The compounding of the methylolmelamine derivative and the product of the reaction of a cobalt salt of an organic acid with a metaboric acid ester as adhesion accelerators in the rubber as a raw material contributes to an improvement in the adhesion of the rubber composition to the steel cords and a well-balanced improvement in the rubber properties.

DETAILED DESCRIPTION OF THE INVENTION

Examples of the methylolmelamine derivative include alkyl ether derivatives of methylolmelamine, among which hexamethoxymethylmelamine, pentamethoxymethylmonomethylolmelamine, and di- and trinuclear analogs thereof are preferred. They may be used either alone or in the form of a mixture of two or more of them. More specific examples thereof include "Cyrez 964" manufactured by American Cyanamide Company, "Resimene 3520" manufactured by The Monsanto Chemical Company, "Sumikanol 507" manufactured by Sumitomo Chemical Co., Ltd. and "Beckamine J-101" manufactured by Dainippon Ink & Chemicals, Inc. Each of them is mainly composed of a methyl ether derivative of methylolmelamine or a di- or trinuclear analog thereof.

The amount of compounding of the alkyl ether derivative of methylolmelamine is preferably in the range of from 0.5 to 8 parts by weight based on 100 parts by weight of the raw material rubber.

The amount of compounding in the above-described range contributes to an improvement in the initial adhesion of the rubber composition to the steel cords and the waterproof adhesion and a remarkable improvement in the heat aging resistance which is a property very important to the rubber composition for coating steel cords. Further, when the amount of compounding is 8 parts by weight or less, the delay of vulcanization of the rubber composition is minimized, which contributes to an improvement in the breaking strength. The amount of compounding is still preferably 1.5 to 4 parts by weight.

Examples of the product of a reaction of a cobalt salt of an organic acid with a metaboric acid ester include a compound represented by the following structural formula:

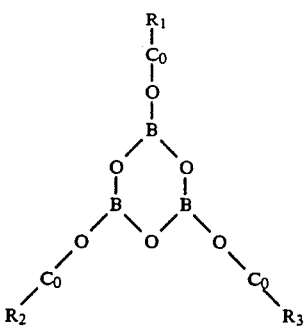

wherein $R_1$, $R_2$ and $R_3$ which may be the same or different stand for each a monocarboxylic acid residue.

Examples of the $R_1$, $R_2$ and $R_3$ as the monocarboxylic acid residue include an aliphatic monocarboxylic acid residue and an alicyclic monocarboxylic acid residue, among which an aliphatic monocarboxylic acid residue having 8 to 12 carbon atoms, a naphthenic acid residue having an acid value of 100 to 340, and a rosin acid residue are preferred. Still preferred is at least one residue selected from the group consisting of an aliphatic monocarboxylic acid residue having 8 to 12 carbon atoms and a naphthenic acid residue having an acid value of 100 to 340.

When the $R_1$, $R_2$ and $R_3$ as the aliphatic monocarboxylic acid residue have 8 or more carbon atoms, an improvement in the waterproof adhesion can be attained. When the number of the carbon atoms is 12 or less, there occurs an increase in the cobalt content in the reaction product, so that it is possible to reduce the amount of compounding of the compound in the rubber composition. When the acid value of the naphthenic acid residue is 100 or more, both the initial adhesion and the waterproof adhesion are improved. Compounds wherein the naphthenic acid residue has an acid value of 340 or less are easily commercially available.

Examples of the aliphatic monocarboxylic acid having 8 to 12 carbon atoms include 2-ethylhexanoic acid, versatic acid ("Versatic 10" manufactured by Shell Kagaku K.K.), neodecanoic acid (manufactured by Exxon Corp.), lauric acid, dimethylhexanoic acid, trimethylhexanoic acid, trimethylpentanoic acid, n-decanoic acid and n-undecanoic acid. Examples of the rosin include gum rosin, wood rosin, tall rosin and the disproportionated and hydrogenated derivatives thereof.

The above-described product of a reaction of a cobalt salt of an organic acid with a metaboric acid ester can be prepared, for example, by mixing a cobalt salt of a monocarboxylic acid with a metaboric acid ester, heating the mixture to bring about a reaction for forming a cobalt-boron compound, and removing a carboxylic acid ester formed as a by-product under ordinary or reduced pressure. In this case, it is preferred to use a mixture of two or more cobalt salts of monocarboxylic acids different from each other in the number of carbon atoms. Examples of the mixture include a mixture of at least one monocarboxylic acid having a relatively large number of carbon atoms selected from an aliphatic monocarboxylic acid having 8 to 12 carbon atoms and a naphthenic acid having an acid value of 100 to 340 with a monocarboxylic acid having a relatively small number of carbon atoms, i.e., 2 to 4 carbon atoms. An alkyl metaborate or an aryl metaborate is preferred as the metaboric acid ester.

The amount of compounding of the product of a reaction of a cobalt salt of an organic acid with a metaboric acid ester is preferably 0.02 to 0.5 parts by weight in terms of cobalt atom based on 100 parts by weight of the raw material rubber. When the amount of compounding of the reaction product is in the above-described range, it is possible to attain a good adhesion to steel cords without detriment to the heat aging resistance. The amount of compounding of the reaction product is still preferably 0.05 to 0.3 part by weight in terms of cobalt atom.

Further, since the product of a reaction of a cobalt salt of an organic acid with a metaboric acid ester is a kind of a cobalt salt, it exhibits the effect of accelerating the adhesion also when used alone. When it is used alone, however, the use of a large amount of sulfenamide vulcanization accelerators, for example, OBS (N-oxydiethylene-2-benzothiazolesulfenamide) and DZ (N,N-dicyclohexyl-2-benzothiazol sulfenamide), deteriorates the waterproof adhesion or other properties of the rubber composition. This drawback can be eliminated through the combined use of two kinds of adhesive accelerators, that is, the above-described reaction product and the methylolmelamine derivative. Further, the combined use can further improve the adhesion to steel cords by virtue of the synergistic effect attained by the two kinds of adhesion accelerators.

Further, in the present invention, it is also possible to further compound at least one member selected from a m-cresol/formaldehyde condensate, a resorcinol condensate and a resorcinol/formaldehyde condensate in an amount of 0.5 to 5 parts by weight based on 100 parts by weight of the raw material rubber for the purpose of further improving the adhesion of the coating rubber to steel cords, particularly steel cords plated with brass.

Examples of the raw material rubber include diene rubbers such as natural rubber, synthetic polyisoprene rubber, polybutadiene rubber and styrene/butadiene copolymer rubber. These raw material rubbers may be used alone or in a combination of two or more of them. In particular, the compounding of the adhesion accelerator according to the present invention in a rubber composition containing natural rubber or synthetic polyisoprene rubber can contribute to a further improvement in the adhesion of the rubber composition to steel cords.

A reinforcing agent such as carbon black, sulfur, a vulcanization accelerator, a vulcanization aid, an antioxidant, a softening agent, etc., are compounded in the rubber composition of the present invention. There is no particular limitation on the formulation and the amount of compounding.

There is no particular limitation on the steel cord to be used in the present invention, but various steel cords known in the art may be used. The steel cords subjected to brass plating and galvanizing are preferred.

The steel cords coated with the above-described rubber composition are useful as a reinforcement for a belt layer of a pneumatic tire, particularly radial tire, and a reinforcement for a belt conveyor, and prevent the peeling of steel cords in these rubber products. More specifically, the durability of these rubber products can be enhanced, not only because the initial adhesion of the coating rubber to the steel cords is good, but also because the lowering in the adhesion under high-temperature and high-humidity conditions during the use of the rubber products is small and the dependency of the adhesion upon the vulcanization conditions is small.

According to the present invention, the combined use of the methylolmelamine derivative and the product of a reaction of the cobalt salt of an organic acid with the metaboric acid ester as an adhesion accelerator serves to improve the initial adhesion of the rubber composition to steel cords, reduce the lowering in the adhesion under high-temperature and high-humidity conditions, offer a well-balanced improvement in the vulcanized rubber properties through an improvement in the moistureproof adhesion and the hot-water-proof adhesion after vulcanization, and further minimize the dependency of the adhesion upon the vulcanization conditions. For this reason, the use of steel cords coated with the rubber composition of the present invention enables the durability of the rubber products to be remarkably improved.

DESCRIPTION OF THE PREFERRED EMBODIMENTS

Five kinds of reaction products A, B, C, D and E which will be described below were prepared.

Reaction product A (cobalt orthoborate naphthenate)

255 g of naphthenic acid having an acid value of 220 was mixed with 93 g of cobalt hydroxide, then 60 g of acetic acid was added thereto, and the temperature of the mixture was raised to 120° C. while stirring to distill off the formed water. The residue was heated to 170° C. and 77 g of butyl orthoborate was added thereto. Butyl acetate formed as a by-product was distilled off at 210° C. to give solid cobalt orthoborate naphthanate having a purple color at room temperature. The cobalt orthoborate naphthanate had a cobalt element content of 17.4% and a boron element content of 1.0%.

Reaction product B (cobalt metaborate naphthnate)

255 g of naphthenic acid having an acid value of 220 was mixed with 93 g of cobalt hydroxide, and 60 g of acetic acid was added thereto. The temperature of the mixture was raised to 120° C. while stirring, and 100 g of cobalt metaborate was added thereto. Butyl acetate formed as a by-product was distilled off at 210° C. to give solid cobalt metaborate naphthanate having a purple color at room temperature. The cobalt metaborate naphthanate had a cobalt element content of 16.1% and a boron element content of 2.8%.

Reaction product C (cobalt metaborate 2-ethylhexanoate)

144 g of 2-ethylhexanoic acid was mixed with 93 g of cobalt hydroxide, then 74 g of propionic acid was added thereto, and the temperature of the mixture was raised to 120° C. while stirring to distil off the formed water. Further, the reaction system was heated to 170° C., and 100 g of butyl metaborate was added thereto. Butyl propionate formed as a by-product was distilled off at 230° C. to give solid cobalt metaborate 2-ethylhexanoate having a purple color at room temperature. The cobalt metaborate 2-ethylhexanoate had a cobalt element content of 23.5% and a boron element content of 4.2%.

Reaction product D (cobalt metaborate versatate)

Cobalt metaborate versatate was prepared in the same manner as that in the synthesis of the reaction product B, except that 175 g of Versatic 10 manufactured by Shell Kagaku K.K. was used instead of 255 g of naphthenic acid. The cobalt metaborate versatate had a cobalt element content of 20.9% and a boron element content of 3.6%.

Reaction product E (cobalt metaborate naphthenate 2-ethylhexanoate)

Cobalt metaborate naphthenate 2-ethylhexanoate was prepared in the same manner as that in the synthesis of the reaction product B, except that a mixed acid comprising 128 g of the naphthenic acid and having an acid value of 220 and 72 g of 2-ethylhexanoic acid was used instead of the use of 255 g of the naphthenic acid alone. The cobalt metaborate naphthenate 2-ethylhexanoate had a cobalt element content of 19.5% and a boron element content of 3.4%.

Compounding ingredients listed in Table 1 were compounded in the above-described five kinds of reaction products A to E to give rubber compositions 1 to 6 of the present invention and comparative compositions 1 to 6.

The compounding was conducted in the following sequence. At the outset, the raw material rubber, the reaction product and other compounding ingredients are mixed with each other in a hermetically sealed mixer. Then, the adhesion accelerator such as the methylolmelamine derivative, sulfur and the vulcanization accelerator were added thereto, and mixing was conducted by means of an open roll.

These 12 kinds of rubber compositions were tested on vulcanized rubber properties and adhesion to steel cords by the following methods. The results are given in Table 1.

Vulcanized rubber properties

Vulcanization was conducted at 160° C. for 15 min through the use of a hydraulic press to from a rubber sheet having a thickness of 2 mm from each rubber composition. A JIS No. 3 dumbbell was prepared from each rubber sheet. The dumbbell was subjected to a tensile test at a tensile speed of 500 mm/min to measure the tensile strength and 100% modulus.

Initial adhesion

According to the method specified in ASTM D-2229, a brass-plated steel cord having a cord structure of 3+9+15×0.175+0.15 was embedded by a length of 25.0 mm in the rubber composition and then subjected to vulcanization bonding under the conditions of 160° C.×20 min and 160° C.×60 min to prepare a sample. The sample was allowed to stand for 24 hr, and the steel cord was pulled out to measure the pulling force and the coverage (%) of the rubber coating the surface of the pulled cord.

Adhesion after deterioration by hot water

The pulling sample after vulcanization used for the evaluation of the initial adhesion was immersed in hot water and deteriorated at 80° C. for 2 weeks, and the pulling force and the rubber coverage were measured in the same manner as that in the measurement of the initial adhesion.

Adhesion after deterioration by steam

The pulling sample after vulcanization used for the evaluation of the initial adhesion was deteriorated in pressurized steam at 105° C. for 24 hr, and the pulling force and the rubber coverage were measured in the same manner as that in the measurement of the initial adhesion.

rubber compositions in the adhesion after deterioration by hot water and the adhesion after deterioration by

TABLE 1

|  | Comp. Ex. 1 | Comp. Ex. 2 | Ex. 1 | Comp. Ex. 3 | Comp. Ex. 4 | Ex. 2 | Comp. Ex. 5 | Comp. Ex. 6 | Ex. 3 | Ex. 4 | Ex. 5 | Ex. 6 |
| --- | --- | --- | --- | --- | --- | --- | --- | --- | --- | --- | --- | --- |
| FORMULATION: |  |  |  |  |  |  |  |  |  |  |  |  |
| natural rubber (RSS #3) | 100 | 100 | 100 | 70 | 70 | 70 | 100 | 100 | 100 | 100 | 100 | 100 |
| Synthetic isoprene rubber | — | — | — | 30 | 30 | 30 | — | — | — | — | — | — |
| carbon black | 55 | 55 | 55 | 60 | 60 | 60 | 62 | 62 | 62 | 62 | 62 | 62 |
| zinc oxide | 8 | 8 | 8 | 10 | 10 | 10 | 8 | 8 | 8 | 8 | 8 | 8 |
| stearic acid | — | — | — | 1 | 1 | 1 | 1 | 1 | 1 | 1 | 1 | 1 |
| antioxidant (6C) | 1 | 1 | 1 | 1 | 1 | 1 | 1 | 1 | 1 | 1 | 1 | 1 |
| aromatic process oil | — | — | — | 2 | 2 | 2 | 2 | 2 | 2 | 2 | 2 | 2 |
| sulfur | 5 | 5 | 5 | 5 | 5 | 5 | 4 | 4 | 4 | 4 | 4 | 4 |
| vulcanization accelerator (DZ) | 1 | 1 | 1 | 0.8 | 0.8 | 0.8 | 0.7 | 0.7 | 0.7 | 0.7 | 0.7 | 0.7 |
| cobalt naphthenate | — | 2 | — | 1 | — | — | 2 | — | — | — | — | — |
| reaction product A | — | — | — | — | 0.59 | — | — | 1.18 | — | — | — | — |
| reaction product B | 1.32 | — | 1.32 | — | — | 0.66 | — | — | 1.32 | — | — | — |
| reaction product C | — | — | — | — | — | — | — | — | — | 0.85 | — | — |
| reaction product D | — | — | — | — | — | — | — | — | — | — | 0.96 | — |
| reaction product E | — | — | — | — | — | — | — | — | — | — | — | 1.03 |
| resorcinol/formaldahyde condensate | — | — | — | 1 | 1 | 1 | 2 | 2 | 2 | 2 | 2 | 2 |
| m-cresol/formaldehyde condensate | — | — | — | — | — | — | 1 | 1 | 1 | 1 | 1 | 1 |
| methylolmelamine derivative | — | 2 | 2 | 3 | 3 | 3 | 4 | 4 | 4 | 4 | 4 | 4 |
| vulcanization properties |  |  |  |  |  |  |  |  |  |  |  |  |
| tensile strength (kg/cm$^2$) | 210 | 208 | 215 | 224 | 226 | 224 | 233 | 230 | 231 | 233 | 235 | 237 |
| 100% modulus (kg/cm$^2$) | 43 | 50 | 49 | 51 | 49 | 48 | 56 | 53 | 54 | 57 | 57 | 58 |
| initial adhesion |  |  |  |  |  |  |  |  |  |  |  |  |
| vulcanized at 160° C. for 20 min. — pulling force (kg) | 116 | 109 | 113 | 109 | 108 | 109 | 108 | 105 | 117 | 110 | 113 | 110 |
| vulcanized at 160° C. for 20 min. — rubber coverage (%) | 95 | 98 | 100 | 100 | 100 | 100 | 100 | 100 | 98 | 100 | 98 | 98 |
| vulcanized at 160° C. for 60 min. — pulling force (kg) | 90 | 87 | 89 | 84 | 90 | 92 | 93 | 98 | 95 | 94 | 98 | 97 |
| vulcanized at 160° C. for 60 min. — rubber coverage (%) | 95 | 93 | 94 | 97 | 96 | 98 | 100 | 97 | 97 | 98 | 99 | 100 |
| after deterioration by hot water |  |  |  |  |  |  |  |  |  |  |  |  |
| vulcanized at 160° C. for 20 min. — pulling force (kg) | 81 | 86 | 115 | 115 | 117 | 118 | 78 | 112 | 120 | 118 | 118 | 117 |
| vulcanized at 160° C. for 20 min. — rubber coverage (%) | 59 | 63 | 92 | 91 | 92 | 93 | 35 | 91 | 94 | 94 | 94 | 94 |
| vulcanized at 160° C. for 60 min. — pulling force (kg) | 74 | 80 | 86 | 77 | 78 | 91 | 100 | 115 | 128 | 124 | 120 | 126 |
| vulcanized at 160° C. for 60 min. — rubber coverage (%) | 35 | 41 | 55 | 33 | 49 | 58 | 86 | 91 | 95 | 94 | 94 | 95 |
| after deterioration by steam |  |  |  |  |  |  |  |  |  |  |  |  |
| vulcanized at 160° C. for 20 min. — pulling force (kg) | 82 | 82 | 83 | 89 | 85 | 80 | 82 | 81 | 93 | 90 | 89 | 90 |
| vulcanized at 160° C. for 20 min. — rubber coverage (%) | 63 | 79 | 92 | 90 | 92 | 93 | 76 | 94 | 94 | 94 | 94 | 95 |
| vulcanized at 160° C. for 60 min. — pulling force (kg) | 81 | 83 | 79 | 80 | 81 | 82 | 69 | 72 | 83 | 80 | 82 | 83 |
| vulcanized at 160° C. for 60 min. — rubber coverage (%) | 41 | 57 | 66 | 70 | 75 | 83 | 47 | 74 | 81 | 80 | 79 | 80 |

In Table 1, the cobalt naphthenate has a cobalt content of 10%.

The resorcinol/formaldehyde condensate is "Penacolite Resin B-18" manufactured by Koppers Co., Inc. Spec. Chem. Div.

The methylolmelamine derivative is "Cyrez" 964 (a mixture of 65% of methylolmelamine derivative mainly composed of hexamethoxymethylolmelamine and di- and tri-nuclear analogs thereof and 35% of white carbon) manufactured by American Cyanamide Company.

The synthetic isoprene rubber is a product manufactured by Nippon Zeon Co., Ltd.

In Table 1, when a comparison is made among the comparative rubber composition 1 wherein solely the reaction product B was compounded, the comparative rubber composition 2 wherein the cobalt naphthenate and the methylolmelamine were compounded, and the rubber composition 1 of the present invention wherein the reaction product B and the methylolmelamine were compounded, it is apparent that although no significant difference in the vulcanized rubber properties and the initial adhesion is observed, the rubber composition 1 of the present invention is far superior to the comparative stem.

When a comparison is made among the comparative rubber composition 3 wherein three compounds, that is, cobalt naphthenate, the resorcinol/formaldehyde condensate and the methylolmelamine derivative were compounded, the comparative rubber composition 4 which is the same as the comparative rubber composition 3, except that the reaction product A was compounded instead of the cobalt naphthenate, and the composition 2 of the present invention which is the same as the comparative rubber composition 3, except that the reaction product B was compounded instead of the cobalt naphthenate, it is apparent that although no significant difference in the vulcanized rubber properties and the initial adhesion is observed, the rubber composition 2 of the present invention is far superior to the comparative rubber compositions in the adhesion after deterioration by hot water and the adhesion after deterioration by steam.

Further, when a comparison is made among six kinds of the rubber compositions, that is, the comparative rubber composition 5 wherein four compounds, that is, the cobalt naphthenate, the resorcinol/formaldehyde condensate, the m-cresol/formaldehyde condensate and the methylolmelamine derivative were compounded, the comparative rubber composition 6 which is the same as the comparative rubber composition 5, except that the reaction product A was compounded instead of the cobalt naphthenate, and the compositions 3, 4, 5 and 6 of the present invention which are the same as the comparative rubber composition 5, except that the reaction products B, C, D and E were respectively compounded, it is apparent that although no significant difference in the vulcanized rubber properties and the initial adhesion is observed, the rubber compositions 3 to 6 of the present invention are far superior to the comparative rubber compositions in the adhesion after deterioration by hot water and the adhesion after deterioration by steam.

In addition, the larger the number of the adhesion accelerators used in combination, the better the vulcanized rubber properties and the adhesion of the rubber composition to steel cords.

What is claimed is:

1. A rubber product reinforced with rubber-coated steel cords comprising steel cords coated with a rubber composition comprising a raw material rubber and, compounded therein, a methylolmelamine derivative and a product of a reaction of a cobalt salt of an organic acid with a metaboric acid ester.

2. A rubber product according to claim 1, which is a pneumatic radial tire or a conveyor belt.

3. A rubber composition for coating steel cords, comprising a raw material rubber and, compounded therein, a methylolmelamine derivative and a product of a reaction of a cobalt salt of an organic acid with a metaboric acid ester.

4. A rubber composition for coating steel cords according to claim 3, wherein the amount of said product of a reaction of a cobalt salt of an organic acid with a metaboric acid ester is about 0.02 to 0.5 part by weight in terms of cobalt atom based on 100 parts by weight of the raw material rubber.

5. A rubber composition for coating steel cords according to claim 3, wherein at least one condensate, a resorcinol condensate and a resorcinol/formaldehyde condensate is compounded therein in an amount of 0.5 to 5 parts by weight based on 100 parts by weight of the raw material rubber.

6. A rubber composition for coating steel cords according to claim 3, wherein the raw material rubber is at least one member selected from natural rubber, synthetic polyisoprene rubber, polybutadiene rubber and styrene/butadiene copolymer rubber.

7. A rubber composition for coating steel cords according to claim 3, wherein the methylolmelamine derivative is at least one alkyl ether derivative of methylolmelamine.

8. A rubber composition for coating steel cords according to claim 7, wherein the amount of of the alkyl ether derivative of methylolmelamine is about 0.5 to 8 parts by weight based on 100 parts by weight of the raw material rubber.

9. A rubber composition for coating steel cords according to claim 7, wherein said methylolmelamine derivative is at least one member selected from the group consisting of hexamethoxymethyl melamine, pentamethoxymethylmonomethylol melamine, di-nuclear analogs of said melamine compounds, and tri-nuclear analogs of said melamine compounds.

10. A rubber composition for coating steel cords according to claim 3, wherein the product of a reaction of a cobalt salt of an organic acid with a metaboric acid ester is a compound represented by the following structural formula:

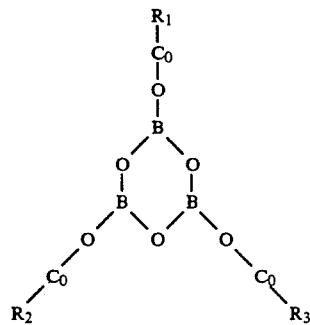

wherein $R_1$, $R_2$ and $R_3$ which may be the same or different monocarboxylic acid residue.

11. A rubber composition for coating steel cords according to claim 10, wherein the $R_1$, $R_2$ and $R_3$ are at least one of an aliphatic monocarboxylic acid residue having 8 to 12 carbon atoms, a naphthenic acid residue having an acid value of 100 to 340, and a rosin acid residue.

* * * * *